(12) United States Patent
Vinayagam et al.

(10) Patent No.: US 12,445,755 B2
(45) Date of Patent: Oct. 14, 2025

(54) ALTERNATE WIRELESS WAN CONNECTIVITY OVER 2.4 GHZ/5GHZ IN HOME ROUTERS

(71) Applicant: ARRIS Enterprises LLC, Suwanee, GA (US)

(72) Inventors: Balaji Vinayagam, Tamil Nadu (IN); Dileep Devaraj, Bangalore (IN); Sovan Acharya, Bangalore (IN); Yashaswini Ashok Kumar, Bangalore (IN); Deepika Arora, Karnataka (IN)

(73) Assignee: ARRIS ENTERPRISES LLC, Horsham, PA (US)

( * ) Notice: Subject to any disclaimer, the term of this patent is extended or adjusted under 35 U.S.C. 154(b) by 202 days.

(21) Appl. No.: 17/984,466

(22) Filed: Nov. 10, 2022

(65) Prior Publication Data

US 2023/0171527 A1 Jun. 1, 2023

Related U.S. Application Data (60) Provisional application No. 63/283,365, filed on Nov. 26, 2021.

(51) Int. Cl.
*H04B 10/03* (2013.01)
*H04B 10/032* (2013.01)
(Continued)

(52) U.S. Cl.
CPC ......... *H04Q 11/0067* (2013.01); *H04B 10/03* (2013.01); *H04B 10/032* (2013.01); *H04B 10/27* (2013.01); *H04W 88/16* (2013.01)

(58) Field of Classification Search
None
See application file for complete search history.

(56) References Cited

U.S. PATENT DOCUMENTS

2014/0293768 A1* 10/2014 Griffioen ............... H04W 24/02
370/216
2015/0016241 A1* 1/2015 Ruffini .................... H04L 45/22
370/216

(Continued)

FOREIGN PATENT DOCUMENTS

EP 3675550 A1 * 7/2020
WO 2021/232309 11/2021

OTHER PUBLICATIONS

International Search Report and Written Opinion issued Mar. 16, 2023 in International Application No. PCT/US2022/049516.

(Continued)

*Primary Examiner* — Li Liu
(74) *Attorney, Agent, or Firm* — Wenderoth, Lind & Ponack, L.L.P.

(57) ABSTRACT

A gateway device is disclosed for use with a WAN, wireless WAN, a LAN, a client device and a wireless device. The client device includes: a memory; a primary communication system; a wireless communication system; and a processor configured to execute instructions stored on the memory to cause the network device to: instruct the primary communication system to transpond the client device data between the client device and the WAN and to transpond the wireless device data between the wireless device and the WAN; detect a loss of connection with the WAN; and instruct the wireless communication system to transpond the client device data between the client device and the WAN via the wireless device and the wireless WAN.

20 Claims, 7 Drawing Sheets

(51) Int. Cl.
*H04B 10/27* (2013.01)
*H04Q 11/00* (2006.01)
*H04W 88/16* (2009.01)

(56) References Cited

U.S. PATENT DOCUMENTS

| | | |
|---|---|---|
| 2015/0319628 A1 | 11/2015 | Elliott et al. |
| 2016/0359693 A1* | 12/2016 | Carter ................ H04Q 11/0062 |
| 2020/0014596 A1* | 1/2020 | Chen ................... H04L 41/5074 |
| 2020/0162943 A1* | 5/2020 | Chen ....................... H04L 69/28 |
| 2020/0213655 A1* | 7/2020 | Feng ....................... G10L 13/00 |

OTHER PUBLICATIONS

International Preliminary Report on Patentability issued Mar. 2, 2024 in International (PCT) Application No. PCT/US2022/049516.

* cited by examiner

ALTERNATE WIRELESS WAN CONNECTIVITY OVER 2.4 GHZ/5GHZ IN HOME ROUTERS

BACKGROUND

Embodiments of the invention relate to using hot spot device.

SUMMARY

Aspects of the present invention are drawn to a gateway device for use with a wide area network (WAN), a wireless WAN, a local area network, a client device and a wireless device. The client device is configured to transmit client device data to the WAN via the local area network and the gateway device. The wireless device is configured to operate in a primary mode so as to wirelessly transmit wireless device data to the WAN via the local area network and the gateway device and is configured to operate in a hotspot mode so as to wirelessly transmit the wireless device data and the client device data to the WAN via the wireless WAN. The client device includes: a memory; a primary communication system configured to transpond the client device data between the client device and the WAN and to transpond the wireless device data between the wireless device and the WAN; a wireless communication system configured to transpond the client device data between the client device and the WAN via the wireless device and the wireless WAN; and a processor configured to execute instructions stored on the memory to cause the network device to: instruct the primary communication system to transpond the client device data between the client device and the WAN and to transpond the wireless device data between the wireless device and the WAN; detect a loss of connection with the WAN; and instruct the wireless communication system to transpond the client device data between the client device and the WAN via the wireless device and the wireless WAN.

In some embodiments, the primary communication system includes an ethernet communication system. In some of these embodiments, the primary communication system additionally includes a wireless communication system. In some of these embodiments, the primary communication system is configured to transpond the client device data between the client device and the WAN via a data over a cable service interface specification communication channel. In some embodiments, the primary communication system is configured to transpond the client device data between the client device and the WAN via a data over a passive optical network communication channel.

In some embodiments, the primary communication system includes a wireless communication system.

Other aspects of the present disclosure are drawn to a method of using a gateway device with a WAN, wireless WAN, a local area network, a client device and a wireless device. The client device is configured to transmit client device data to the WAN via the local area network and the gateway device. The wireless device is configured to operate in a primary mode so as to wirelessly transmit wireless device data to the WAN via the local area network and the gateway device and is configured to operate in a hotspot mode so as to wirelessly transmit the wireless device data and the client device data to the WAN via the wireless WAN. The method includes: instructing, via a processor configured to execute instructions stored on a memory, a primary communication system to transpond the client device data between the client device and the WAN and to transpond the wireless device data between the wireless device and the WAN; detecting, via the processor, a loss of connection with the WAN; and instructing, via the processor, a wireless communication system to transpond the client device data between the client device and the WAN via the wireless device and the wireless WAN.

In some embodiments, the instructing, via the processor configured to execute instructions stored on a memory, the primary communication system to transpond the client device data between the client device and the WAN and to transpond the wireless device data between the wireless device and the WAN includes instructing an ethernet communication system to transpond the client device data between the client device and the WAN and to transpond the wireless device data between the wireless device and the WAN. In some of these embodiments, the instructing, via the processor configured to execute instructions stored on a memory, the primary communication system to transpond the client device data between the client device and the WAN and to transpond the wireless device data between the wireless device and the WAN additionally includes instructing a wireless communication system to transpond a portion of the client device data between the client device and the WAN and to transpond a portion of the wireless device data between the wireless device and the WAN. In some of these embodiments, the instructing, via the processor configured to execute instructions stored on a memory, the primary communication system to transpond the client device data between the client device and the WAN and to transpond the wireless device data between the wireless device and the WAN includes instructing the primary communication system to transpond the client device data between the client device and the WAN and to transpond the wireless device data between the wireless device and the WAN via a data over a cable service interface specification communication channel. In some of these embodiments, the instructing, via the processor configured to execute instructions stored on a memory, the primary communication system to transpond the client device data between the client device and the WAN and to transpond the wireless device data between the wireless device and the WAN includes instructing the primary communication system to transpond the client device data between the client device and the WAN and to transpond the wireless device data between the wireless device and the WAN via a passive optical network communication channel.

In some embodiments, the instructing, via the processor configured to execute instructions stored on a memory, the primary communication system to transpond the client device data between the client device and the WAN and to transpond the wireless device data between the wireless device and the WAN additionally includes instructing a wireless communication system to transpond the client device data between the client device and the WAN and to transpond the wireless device data between the wireless device and the WAN.

Other aspects of the present disclosure are drawn to a non-transitory, computer-readable media having computer-readable instructions stored thereon. The computer-readable instructions are capable of being read by a gateway device for use with a WAN, wireless WAN, a local area network, a client device and a wireless device. The client device is configured to transmit client device data to the WAN via the local area network and the gateway device. The wireless device is configured to operate in a primary mode so as to wirelessly transmit wireless device data to the WAN via the local area network and the gateway device and being configured to operate in a hotspot mode so as to wirelessly transmit the wireless device data and the client device data to the WAN via the wireless WAN. The computer-readable instructions are capable of instructing the client device to perform the method including: instructing, via a processor configured to execute instructions stored on a memory, a primary communication system to transpond the client device data between the client device and the WAN and to transpond the wireless device data between the wireless device and the WAN; detecting, via the processor, a loss of connection with the WAN; and instructing, via the processor, a wireless communication system to transpond the client device data between the client device and the WAN via the wireless device and the wireless WAN.

In some embodiments, the computer-readable instructions are capable of instructing the client device to perform the method wherein the instructing, via the processor configured to execute instructions stored on a memory, the primary communication system to transpond the client device data between the client device and the WAN and to transpond the wireless device data between the wireless device and the WAN includes instructing an ethernet communication system to transpond the client device data between the client device and the WAN and to transpond the wireless device data between the wireless device and the WAN. In some of these embodiments, the computer-readable instructions are capable of instructing the client device to perform the method wherein the instructing, via the processor configured to execute instructions stored on a memory, the primary communication system to transpond the client device data between the client device and the WAN and to transpond the wireless device data between the wireless device and the WAN additionally includes instructing a wireless communication system to transpond a portion of the client device data between the client device and the WAN and to transpond a portion of the wireless device data between the wireless device and the WAN. In some of these embodiments, the computer-readable instructions are capable of instructing the client device to perform the method wherein the instructing, via the processor configured to execute instructions stored on a memory, the primary communication system to transpond the client device data between the client device and the WAN and to transpond the wireless device data between the wireless device and the WAN includes instructing the primary communication system to transpond the client device data between the client device and the WAN and to transpond the wireless device data between the wireless device and the WAN via a data over a cable service interface specification communication channel. In some of these embodiments, the computer-readable instructions are capable of instructing the client device to perform the method wherein the instructing, via the processor configured to execute instructions stored on a memory, the primary communication system to transpond the client device data between the client device and the WAN and to transpond the wireless device data between the wireless device and the WAN includes instructing the primary communication system to transpond the client device data between the client device and the WAN and to transpond the wireless device data between the wireless device and the WAN via a passive optical network communication channel.

In some embodiments, the computer-readable instructions are capable of instructing the client device to perform the method wherein the instructing, via the processor configured to execute instructions stored on a memory, the primary communication system to transpond the client device data between the client device and the WAN and to transpond the wireless device data between the wireless device and the WAN additionally includes instructing a wireless communication system to transpond the client device data between the client device and the WAN and to transpond the wireless device data between the wireless device and the WAN.

BRIEF SUMMARY OF THE DRAWINGS

The accompanying drawings, which are incorporated in and form a part of the specification, illustrate example embodiments and, together with the description, serve to explain the principles of the disclosure. In the drawings.

DETAILED DESCRIPTION

Figure 1A:
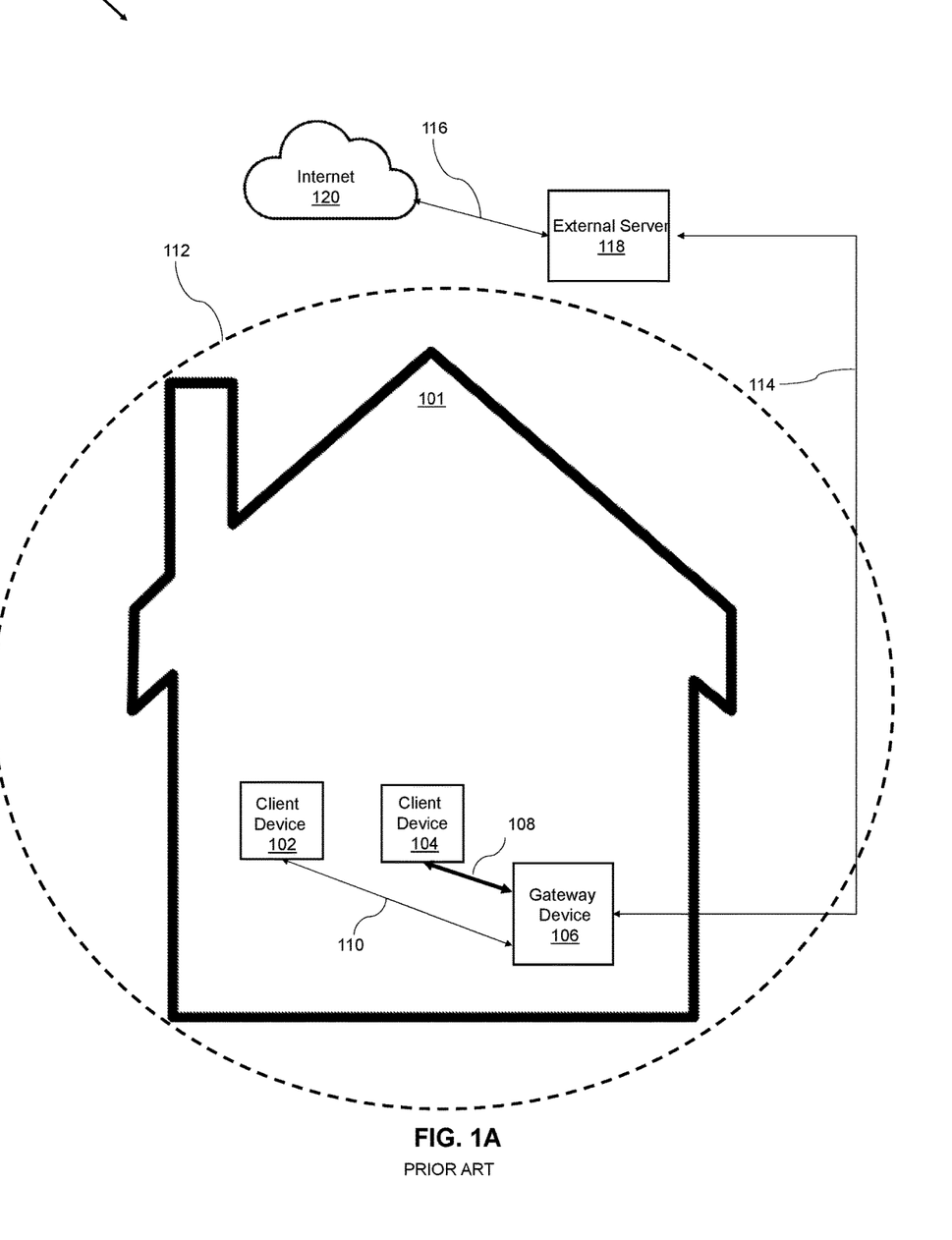
FIG. 1A illustrates a communication system at a time $t_0$.

FIG. 1A illustrates a communication system 100 at a time $t_0$.

As shown in FIG. 1A, communication system 100 includes: a client device 102 and 104; a gateway device 106; a wired communication channel 108; wireless communication channels 110, communication channels 114, and 116; a local area network (LAN) 112; an external server 118; and Internet 120.

Client devices 102 and 104 may be any devices or systems that present content to, accept inputs from, or directly or indirectly interact with user 102. In this non-limiting example, client devices 102 and 104 may be smart phones, tablets, personal computers, TV set-top boxes, videogame consoles, smart media devices, home security devices, or Internet-of-Things (IoT) devices.

Gateway device 106 is a device that combines the functions of a modem and a router. A modem is a device that connects to cable or phone lines and translates the data or information from the Internet to a computer or connected device. A router is a device that works with the modem to create and manage a wireless network so as to wirelessly take the data coming through the modem and sends it wirelessly to multiple devices like smart phones, tablets, gaming consoles, and computers. The consumer premises can include a residential dwelling, an office, or any other business space of a user, such as residence 101. The terms home, office, and premises may be used synonymously herein.

Gateway device 106 may perform such functions as Web acceleration and HTTP compression, flow control, encryption, redundancy switchovers, traffic restriction policy enforcement, data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing.

Further, it should be noted that gateway device 106 is able to communicate with external server 110 via communication channel 114, which may optionally be a wireless communication system, such as 4G, or 5G, or may optionally be any known type of wired communication channels, non-limiting examples of which include ethernet, DSL, and Fiber. Gateway device 106 is further is able to connect to Internet 120 via communication channel 116, which may optionally be a wireless communication system, such as 4G, or 5G, or may optionally be any known type of wired communication channels, non-limiting examples of which include ethernet, DSL, and Fiber.

Gateway device 106 serves as a gateway or access point to Internet 120 for one or more electronic devices.

A wireless access point (WAP), or more generally known as an access point (AP), is a networking hardware device that allows other Wi-Fi devices to connect to a Wi-Fi network. A service set ID (SSID) is an identification (in IEEE 802.11) that is broadcast by access points in beacon packets to announce the presence of a network access point for the SSID. SSIDs are customizable IDs that can be zero to 32 bytes, and can be in a natural language, such as English. In residence 101, gateway device 106 is an access point.

Client device 102 is wirelessly connected to gateway device 106. Client device 104 is physically connected to gateway device 106, e.g., through an ethernet.

LAN 112 is created and managed through gateway device 106. LAN 112 is illustrated as a single network, merely for purposes of discussion. It should be noted that LAN 112 may represent a plurality of local area networks created and managed through gateway device 106. LAN 112 is a communication network where client device 102 can wirelessly communicate with gateway device 106 in order to access Internet 120 through communication channel 114, external server 110, and communication channel 116. Client device 104 is connected to LAN 112 through wired communication channel 108. As such, for purposes of this discussion, LAN 112 includes a wireless network for client device 102 to wireless communicate with gateway device 106 and a wired network, e.g., an ethernet network, for client device 104 to communicate with gateway device 106.

Figure 1B:
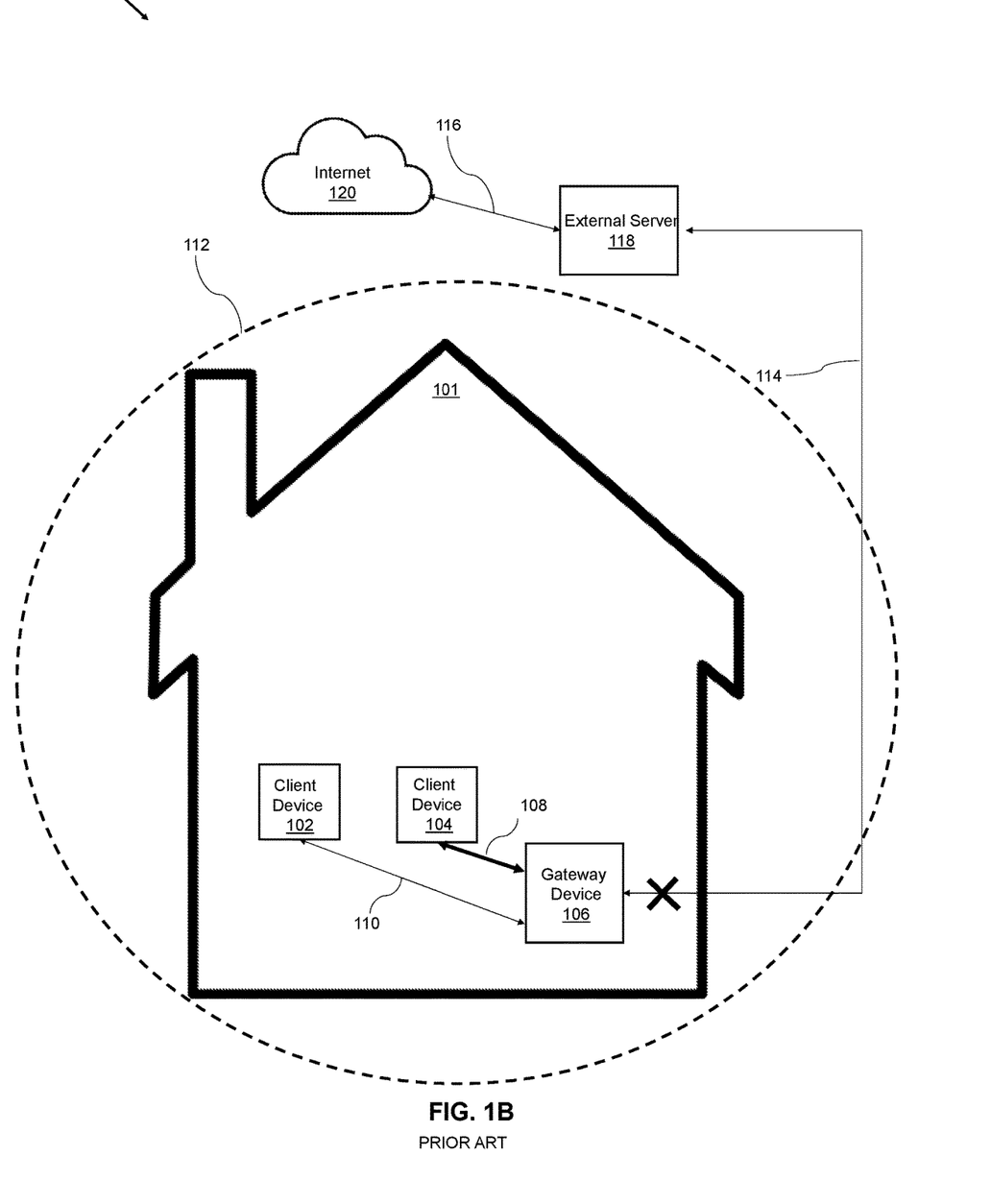
FIG. 1B illustrates a communication system at a time $t_1$.

FIG. 1B illustrates communication system 100 at a time $t_1$.

As shown in FIG. 1B, communication channel 114 has been disconnected. Gateway device 106 no longer has access to Internet 120. Non-limiting examples of reasons for gateway device 106 being disconnected from Internet 120 include: inclement weather; a cable line being cut; or connectivity issues with the wired or wireless communication functions of gateway device 106.

In instances where the gateway device is disconnected from the WAN, it can be inconvenient to users operating network devices. In particular, client device 104 may still communicate with gateway device 106 via wired communication channel 108 and client device 102 may communicate with gateway device 106 via wireless communication channel 110. However, if either of client device 104 or client device 102 are attempting to access Internet 120 via gateway device 106, in instances where the communication between gateway device 106 and Internet 120 are down, client device 104 and client device 102 will also be unable to access Internet 120. While these instances may be few and far between, some will be more inconvenient than others due to the length of time that the gateway device is disconnected from the Internet. There needs to be a way for users to minimize time without Internet access while the gateway device attempts to reconnect to the network.

What is needed is a system and method for alternately connecting to a WAN in instance where the communication between a gateway device and an external WAN are down.

A system and method in accordance with the present disclosure connects to a WAN through the use of a hotspot.

In accordance with the present disclosure, a gateway device is used with a hotspot client device. The hotspot client device will connect to the network associated with the gateway device. The gateway device and hotspot client device will communicate with one another through the use of primary radios. In the case of the gateway device disconnects from a WAN, the gateway device will instruct the hotspot client device to begin operating as a hotspot. For purposes of discussion only, let the WAN be the Internet in example embodiments disclosed herein. As such, it should be noted that in a broader sense, a gateway device in accordance with aspects of the present disclosure may additionally be used with any WAN.

The hotspot client device may then connect to the Internet by an alternate method, e.g., via a cellular network through the use of a cellular radio. The gateway device will connect to the hotspot client device, and thereby be connected to the Internet through the hotspot client device. The hotspot client device will temporarily provide Internet access to all devices connected to the gateway device. Once the gateway device is again able to connect to the Internet, the gateway device will instruct the hotspot client device to stop operating as a hotspot. In this way, all the client devices will still have access to the Internet when the direct communication between the gateway device and the Internet is disrupted.

An example system and method for connecting to a Internet through the use of a hotspot in accordance with aspects of the present disclosure will now be described in greater detail with reference to FIGS. 2-4.

Figure 2:
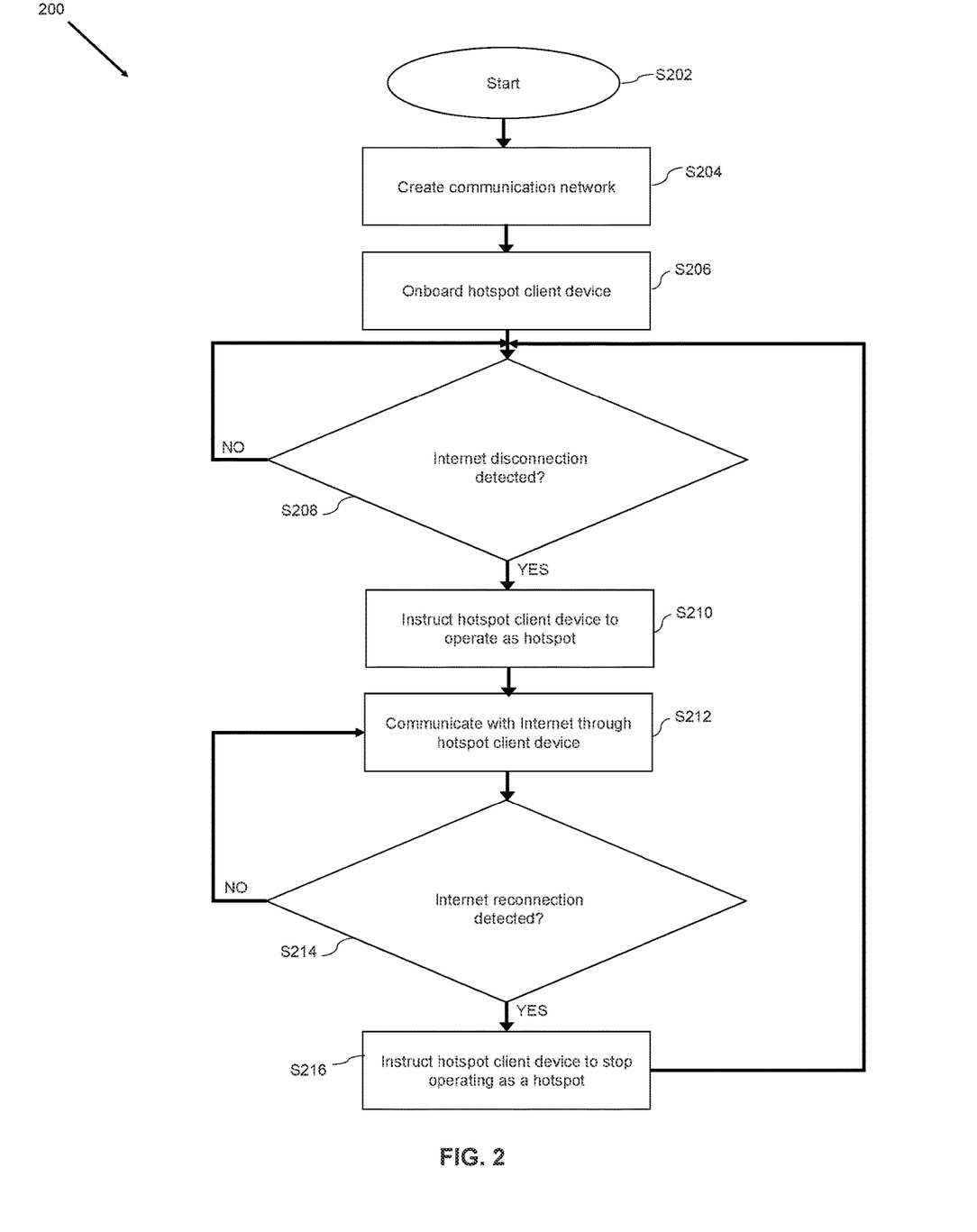
FIG. 2 illustrates a method for using a hotspot to alternatively connect a gateway device to the Internet in accordance with aspects of the present disclosure.

FIG. 2 illustrates an algorithm 200 to be executed by a processor for using a hotspot to alternatively connect a gateway device to the Internet in accordance with aspects of the present disclosure.

As shown in FIG. 2, algorithm 200 starts (S202) and a communication network is created (S202). This will be described in greater detail with reference to FIG. 3A.

Figure 3A:
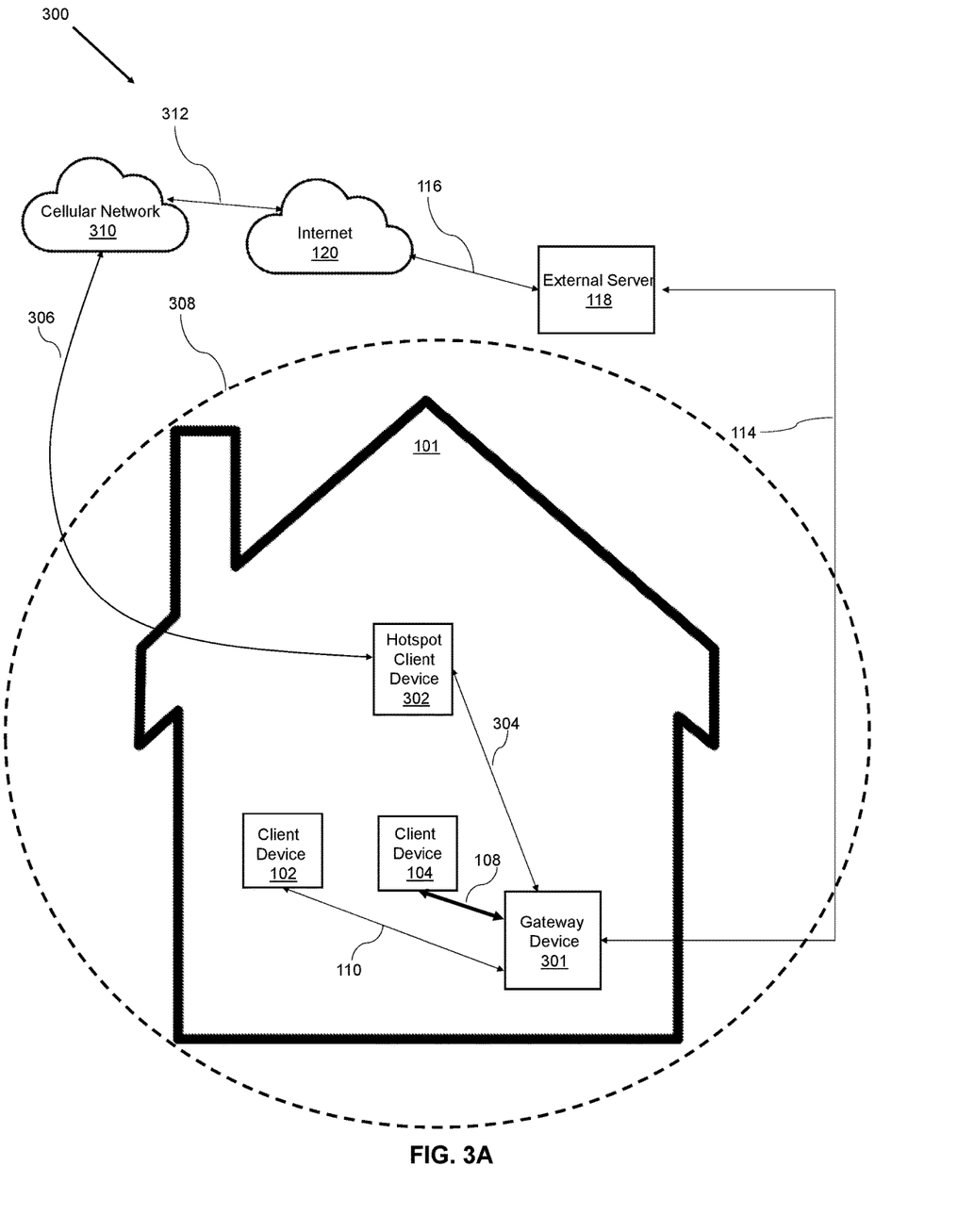
FIG. 3A illustrates a communication system at a time $t_0$ in accordance with aspects of the present disclosure.

FIG. 3A illustrates a communication system 300 at a time $t_0$ in accordance with aspects of the present disclosure.

As shown in FIG. 3A, communication system 300 includes: client devices 102, 104, and 302; a gateway device 301; wired communication channel 108; wireless communication channels 110, 114, 116, and 304; a local area network (LAN) 308; a cellular communication channel 306; external server 118; Internet 120; and a cellular network 310.

Gateway device 301 is a device that combines the functions of a modem and a router. A modem is a device that connects to cable or phone lines and translates the data or information from the Internet to a computer or connected device. A router is a device that works with the modem to create and manage a wireless network so as to wirelessly take the data coming through the modem and sends it wirelessly to multiple devices like smart phones, tablets, gaming consoles, and computers. The consumer premises can include a residential dwelling, an office, or any other business space of a user, such as residence 101. The terms home, office, and premises may be used synonymously herein.

Gateway device 301 may perform such functions as Web acceleration and HTTP compression, flow control, encryption, redundancy switchovers, traffic restriction policy enforcement, data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing.

Further, it should be noted that gateway device 301, in a primary mode of operation, is able to communicate with external server 118 via communication channel 114, which may optionally be a wireless communication system, such as 4G, or 5G, and further is able to connect to Internet 120 via communication channel 116. Further, as will be described in greater detail below, gateway device 301, in a hotspot mode of operation, is additionally able to communicate with external server 118, when communication channel 114 is down, alternatively via hotspot client device 302, communication channel 306, cellular network 310 communication channel 312, internet 120 and communication channel 116 in accordance with aspects of the present disclosure.

Gateway device 301 serves as a gateway or access point to Internet 120 for one or more electronic devices.

Hotspot client device 302 is connected to gateway device 301 wirelessly. Further, hotspot client device 302 is able to connect to internet 120 through cellular communication channel 306, cellular network 310, and wireless communication channel 312.

LAN 308 is created and managed through gateway device 301. LAN 308 is illustrated as a single network, merely for purposes of discussion. It should be noted that LAN 308 may represent a plurality of local area networks created and managed through gateway device 301. LAN 308 is a communication network where client device 102 can wirelessly communicate with gateway device 301 in order to access Internet 120 through communication channel 114, external server 110, and communication channel 116. Client device 104 is connected to LAN 308 through wired communication channel 108. As such, for purposes of this discussion, LAN 308 includes a wireless network for client device 102 to wireless communicate with gateway device 301 and a wired network, e.g., an ethernet network, for client device 104 to communicate with gateway device 301.

It should be noted that LAN 308 is illustrated and discussed to include a single wireless network and a single wired network. However, in accordance with aspects of the present disclosure, gateway device 301 may create and manage a plurality of distinct local area networks. As such, LAN 308 is representative of a summation of local area networks created and managed by gateway device 301. Further, gateway device 301 is configured to act as a bridge for communications from the summation of local area networks to the Internet.

In operation, client device 102 may onboard onto LAN 308 through known wireless protocols, a non-limiting example of which includes Wi-Fi network protocols. Similarly, client device 104 may connect to LAN 308 by known protocols, a non-limiting example of which includes ethernet protocols. Therefore, in this example, LAN 308 includes client devices 102 and 104 and gateway device 301.

After a communication network is created (S202), the hotspot client device is onboarded (S204). For example, hotspot client device 302 may onboard to LAN 308 through known wireless protocols, a non-limiting example of which includes Wi-Fi protocols. Once onboarded, hotspot client device 302 is connected to the same wireless network as client device 102, and is able to wirelessly communicate with gateway device 301.

Hotspot client device 302 is similar to client device 102, in that hotspot client device 302 may communicate with gateway device 301 over the local wireless network created and managed by gateway device 301. However, hotspot client device 302 differs from client device 102, in that hotspot client device is additionally capable of connecting to Internet 120 through cellular communication channel 306 and becoming a Wi-Fi hotspot for gateway device 301.

In some embodiments, at least one of client device 102 and client device 104 may be configured to become a Wi-Fi hotspot for gateway device 301 in instances where wireless communication channel 114 is inactive. For purposes of the discussion only, in this example, hotspot client device 302 will be configured to act as a hotspot for gateway device 301.

After the hotspot client device is onboarded (S204), it is determined if the Internet has disconnected (S208). This will be described in greater detail with reference to FIG. 4.

Figure 4:
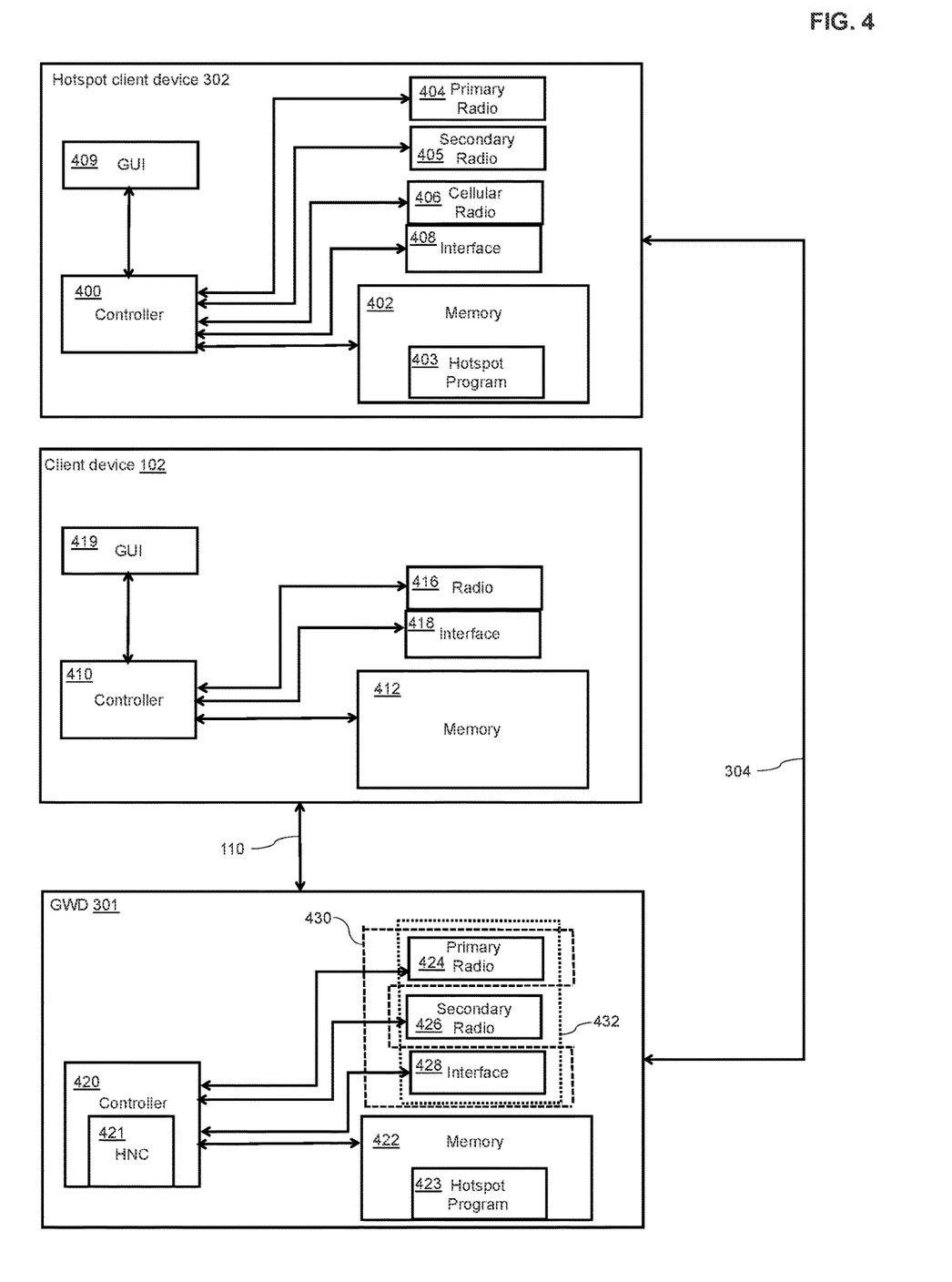
FIG. 4 illustrates an exploded view of a hotspot client device, a client device, and a gateway device in accordance with aspects of the present disclosure.

FIG. 4 illustrates an exploded view of hotspot client device 302, client device 102, and gateway device 301.

As shown in FIG. 4, hotspot client device 302 includes a controller 400; a memory 402, which has stored therein a hotspot program 403; at least one radio, a sample of which is illustrated as a primary radio 404, a secondary radio 405 and a cellular radio 406; an interface 408; and a graphic user interface (GUI) 409.

In this example, controller 400, memory 402, primary radio 404, secondary radio 405, cellular radio 406, and interface 408 are illustrated as individual devices. However, in some embodiments, at least two of controller 400, memory 402, primary radio 404, secondary radio 405, and cellular radio 406, and interface 408 may be combined as a unitary device. Further, in some embodiments, at least one of controller 400 and memory 402 may be implemented as a computer having tangible computer-readable media for carrying or having computer-executable instructions or data structures stored thereon. Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from and write information to the tangible computer-readable media. In the alternative, the tangible computer-readable media may be integral to the processor. The processor and the tangible computer-readable media may reside in an integrated circuit (IC), an application specific integrated circuit (ASIC), or large scale integrated circuit (LSI), system LSI, super LSI, or ultra LSI components that perform a part or all of the functions described herein. In the alternative, the processor and the tangible computer-readable media may reside as discrete components.

Example tangible computer-readable media may be also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

Controller 400 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of hotspot client device 302 in accordance with the embodiments described in the present disclosure.

Memory 402, as will be described in greater detail below, has instructions, including hotspot program 403, stored therein to be executed by controller 400 to allow hotspot client device 302 to: receive instructions from gateway device 301 to operate as a hotspot; operate as a hotspot for LAN 308; and receive instructions from gateway device 301 to stop operating as a hotspot.

Primary radio 404 and secondary radio 405 may include a Wi-Fi WLAN interface radio transceiver that is operable to communicate with gateway device 301, as shown in FIG. 3A, and also may include a cellular transceiver operable to communicate with a cellular network. Primary radio 404, secondary radio 405, and cellular radio 406 include one or more antennas and communicates wirelessly via one or more of the 2.4 GHz band, the 5 GHz band, the 6 GHz band, and the 60 GHz band, or at the appropriate band and bandwidth to implement any IEEE 802.11 Wi-Fi protocols, such as the Wi-Fi 4, 5, 6, or 6E protocols. Hotspot client device 302 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands or 6E GHz bands, RF4CE protocol, ZigBee protocol, Z-Wave protocol, or IEEE 802.15.4 protocol.

Primary radio 404 is configured to allow hotspot client device 302 to communicate with gateway device 301, when operating in a primary mode of operation. Secondary radio 405 is configured to communicate with gateway device 301, in a hotspot mode of operation, wherein wireless communication channel 114 has been disconnected from gateway device 301. In other words, in a primary mode of operation, primary radio 404 is active and secondary radio 405 is inactive. However, in a hotspot mode of operation, primary radio 404 is inactive and secondary radio 405 is active.

Cellular radio 406 is configured to communicate with cellular network 310 when gateway device 301 no longer has connection to Internet 120, due to the disconnection of wireless communication channel 114.

As shown in FIG. 3A, cellular radio 406 is configured to enable hotspot client device 302 to wireless communicate with cellular network 310 over communication channel 306, by known cellular protocols.

Returning to FIG. 4, interface 408 can include one or more connectors, such as RF connectors, or Ethernet connectors, and/or wireless communication circuitry, such as 5G circuitry and one or more antennas.

GUI 409 may be any known device or system to display an interactive image to enable a user to interact with hotspot client device 302.

Client device 102 includes a controller 410; a memory 412; at least one radio, a sample of which is illustrated as a primary radio 414 and a secondary radio 416; an interface 418; and a GUI 419.

In this example, controller 410, memory 412, primary radio 414, secondary radio 416, and interface 418 are illustrated as individual devices. However, in some embodiments, at least two of controller 410, memory 412, primary radio 414, secondary radio 416, and interface 418 may be combined as a unitary device. Further, in some embodiments, at least one of controller 410 and memory 412 may be implemented as a computer having tangible computer-readable media for carrying or having computer-executable instructions or data structures stored thereon.

Controller 410 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of extender 302 in accordance with the embodiments described in the present disclosure.

Memory 412 can store various programming, user content, and data.

Radio 416 may include a Wi-Fi WLAN interface radio transceiver that is operable to communicate with gateway device 301. Radio 416 includes one or more antennas and communicate wirelessly via one or more of the 2.4 GHz band, the 5 GHz band, the 6 GHz band, and the 6E GHz band, or at the appropriate band and bandwidth to implement any IEEE 802.11 Wi-Fi protocols, such as the Wi-Fi 4, 5, 6, or 6E protocols. Radio 416 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands or 6E GHz bands, RF4CE protocol, ZigBee protocol, Z-Wave protocol, or IEEE 802.15.4 protocol.

Interface 418 can include one or more connectors, such as RF connectors, or Ethernet connectors, and/or wireless communication circuitry, such as 5G circuitry and one or more antennas.

GUI 419 may be any known device or system to display an interactive image to enable a user to interact with client device 104.

Gateway device 301 includes a controller 420, which has stored therein a home network controller (HNC) 421; a memory 422, which has stored therein a hotspot program 423; and at least one radio, a sample of which is illustrated as a primary radio 424 and a secondary radio 426; and an interface 428. Primary radio 424 and interface 428 together are considered a primary communication system 430, whereas primary radio, secondary radio 426, and interface 428 are considered a secondary communication system 432.

Primary communication system 430 is configured to enable gateway device 301 to operate in the primary mode of operation, wherein gateway device 301 is able to communicate with hotspot client device 302, client device 102, and client device 104 in the primary mode of operation, wherein gateway device 301 is able to communicate with Internet 102 via communication channel 114 (and external server 118 and communication channel 116). In particular, in the primary mode of operation, primary radio 424 enables gateway device 301 to wireless communicate with client device 102 and hotspot client device 302, whereas interface 428 enables gateway device 301 to communicate with client device 104.

Secondary communication system 432 is configured to enable gateway device 301 to operate in the hotspot mode of operation, wherein gateway device 301 is able to communicate with client device 102, and client device 104 in the hotspot mode of operation, wherein gateway device 301 is able to communicate with Internet 102 via hotspot client device 302 (and cellular communication channel 306, cellular network 310, and wireless communication channel 312). In particular, in the hotspot mode of operation, primary radio 424 enables gateway device 301 to wireless communicate with client device 102 and interface 428 enables gateway device 301 to communicate with client device 104. However, as opposed to the primary mode of operation, in the hotspot mode of operation, secondary radio 426 enables gateway device 301 to wireless communicate with hotspot client device 302 over a dedicated channel so as to transpond data from client device 102 and client device 104 to Internet 120 via cellular communication channel 306, cellular network 310 and wireless communication channel 312.

In this example, controller 420, memory 422, primary radio 424, secondary radio 426 and interface 428 are illustrated as individual devices. However, in some embodiments, at least two of controller 420, memory 422, primary radio 424, secondary radio 426, and interface 428 may be combined as a unitary device. Further, in some embodiments, at least one of controller 420 and memory 422 may be implemented as a computer having tangible computer-readable media for carrying or having computer-executable instructions or data structures stored thereon.

Controller 420 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of gateway device 301 in accordance with the embodiments described in the present disclosure.

HNC 421 controls gateway device 301 within the wireless network. HNC 421 may perform tasks such as steering connected devices, a non-limiting example of which is a cell phone, from one access point to another.

Memory 422, as will be described in greater detail below, has instructions, including hotspot program 423, stored therein to be executed by controller 420 to allow gateway device 301 to: instruct primary communication system 430 to transpond the client device data between client devices 102 and 104 and Internet 120 and to transpond the wireless device data between hotspot client device 302 and Internet 120; detect a loss of connection with Internet 120; and instruct secondary communication system 432 to transpond the client device data between client devices 102 and 104 and Internet 120 via the hotspot client device 302 and cellular network 310. Accordingly, gateway device 301 differs from gateway device 106 discussed above with reference to FIGS. 1A-B in that gateway device 301 includes hotspot program 423 that enables gateway device 301 to operate in accordance with aspects of the present disclosure.

In some embodiments, primary communication system 430 includes an ethernet communication system. For example, in cases where a wired network is provided via interface 428. This is discussed above with reference to client device 104 communicating with gateway device 301 via wired communication channel 108.

In some further embodiments, primary communication system 430 additionally includes a wireless communication system. For example, in cases where a wireless network is provided via primary radio 424. This is discussed above with reference to client device 102 communicating with gateway device 301 via wireless communication channel 110.

In some further embodiments, primary communication system 430 is configured to transpond the client device data between client devices 102 and 104 and Internet 120 via a data over a cable service interface specification (DOCSIS) communication channel.

In some of these embodiments, primary communication system 430 is configured to transpond the client device data between client devices 102 and 104 and Internet 120 via a data over a passive optical network (PON) communication channel.

In some of these embodiments, primary communication system 430 is configured to transpond the client device data between client devices 102 and 104 and Internet 120 via other known communication channels, a non-limiting example of which includes a cellular communication channel.

Primary radio 424 and secondary radio 426, may include a Wi-Fi WLAN interface radio transceiver that is operable to communicate with client device 301, extender 302 and external server 110. Primary radio 424 and secondary radio 426 includes one or more antennas and communicates wirelessly via one or more of the 2.4 GHz band, the 5 GHz band, the 6 GHz band, and the 6E GHz band, or at the appropriate band and bandwidth to implement any IEEE 802.11 Wi-Fi protocols, such as the Wi-Fi 4, 5, 6, or 6E protocols. Primary radio 424 and secondary radio 426 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands or 6E GHz bands, RF4CE protocol, ZigBee protocol, Z-Wave protocol, or IEEE 802.15.4 protocol.

Primary radio 424 is configured to communicate with client device 102. More specifically, primary radio 424 is configured to communicate with client device 102 and hotspot client device 302, while gateway device 301 remains connected to Internet 120. Further, primary radio 424 is configured to communicate with client device 102 in those instances when gateway device 301 is disconnected from Internet 120. Secondary radio 426 is configured to communicate with hotspot client device 302 when gateway device 301 is disconnected from Internet 120.

Interface 428 can include one or more connectors, such as RF connectors, or Ethernet connectors, and/or wireless communication circuitry, such as 5G circuitry and one or more antennas. Interface 428 receives data from external server 110 by known methods, non-limiting examples of which include terrestrial antenna, satellite dish, wired cable, DSL, optical fibers, or 5G as discussed above. Interface 428 is additionally configured to communicate with client device 104.

During a primary mode of operation, primary communication system 430 is configured to transpond the data of client devices 102 and 104 between Internet 120. Further, during the primary mode of operation, primary communication system 430 is configured to transpond the data of hotspot client device 302 between hotspot client device 302 and Internet 120.

During a hotspot mode of operations, secondary communication system 432 is configured to transpond the data of client devices 102 and 104 to hotspot client device 302, so as to then be transponded to Internet 120 via cellular network 310.

Returning to FIG. 2, presume that client devices 102 and 104 and hotspot client device 302 are connected to LAN 308. Gateway device 301 is configured to monitor the connection status of gateway device 301 to Internet 120. Gateway device 301 may monitor the connection status of gateway device 301 to Internet 120 by any known method, a non-limiting example of which includes: controller 420 executing instructions within memory 422 to instruct interface 428 to transmit an Internet Control Message Protocol (ICMP) echo request to external server 110; and controller 420 determining that an echo is not received by interface 428 in response to the ICMP echo request.

If is determined that the Internet has not disconnected (N at S208), the gateway device will continue to monitor the connection status of the Internet (Return to S208). For example, presume that gateway device 301 is operating in the primary mode of operation, and is providing Internet access to client devices 102 and 104 and hotspot client device 302. Gateway device 301 will continue to operate and monitor the connection status to Internet 120.

If is determined that the Internet has disconnected (Y at S208), the hotspot client device is instructed to operate as a hotspot (S210). For example if wireless communication channel 114 disconnects gateway device 301 from Internet 120, gateway device 301 will contact hotspot client device 302 and instruct hotspot client device 302 to operate as a hotspot to allow client devices 102 and 104 to reconnect to LAN 308. This will be described in greater detail with reference to FIG. 3B.

Figure 3B:
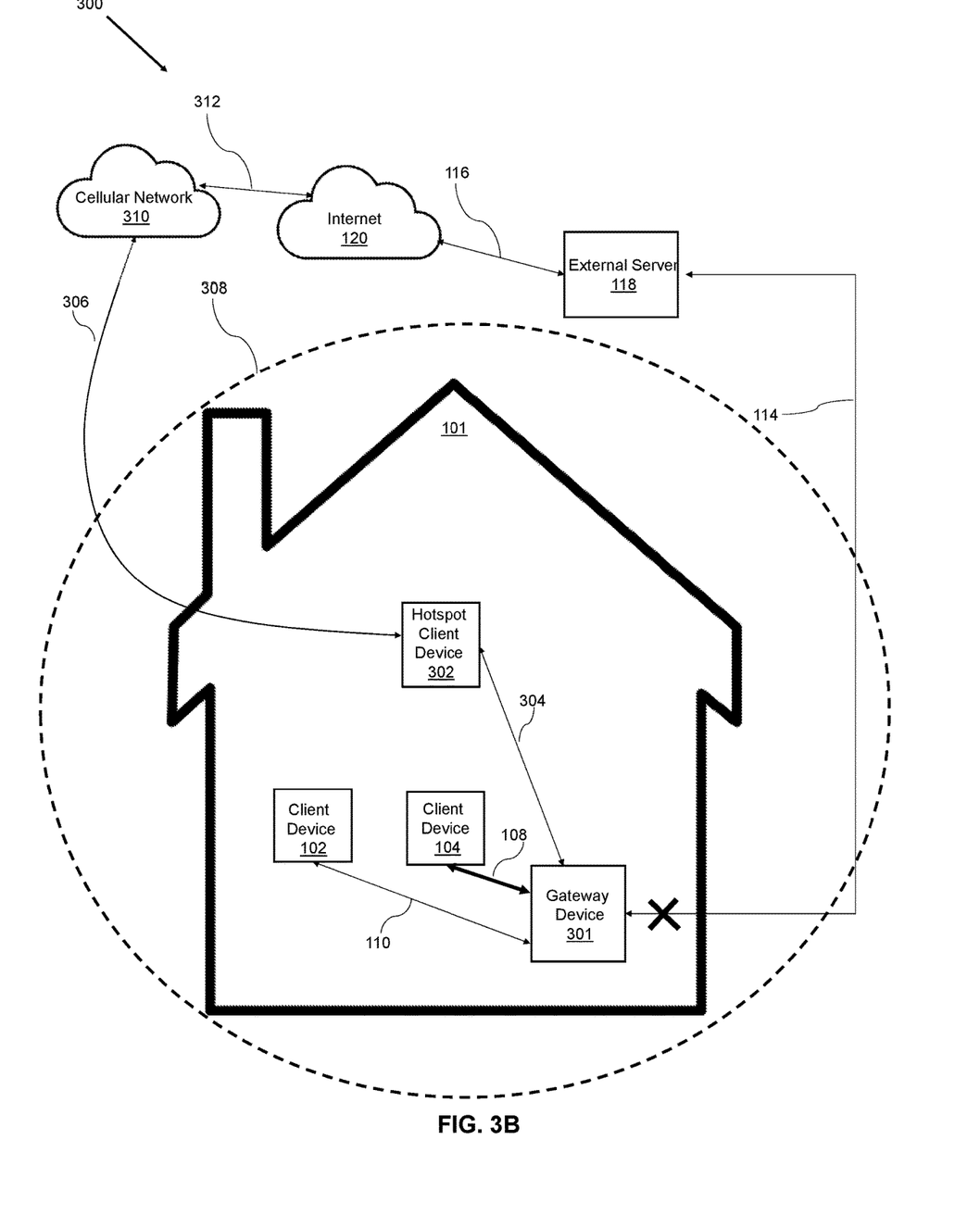
FIG. 3B illustrates a communication system at a time $t_1$ in accordance with aspects of the present disclosure.

FIG. 3B illustrates a communication system 300 at a time $t_1$ in accordance with aspects of the present disclosure.

As shown in FIG. 3B, wireless communication system 114 is crossed out, indicating that gateway device 301 no longer has access to Internet 120 through wireless communication channel 114.

Now consider the situation wherein gateway device 301 has been disconnected from Internet 120. Returning to FIG. 4, controller 420 is configured to execute instructions stored on memory 422, including hotspot program 423, to cause gateway device 301 to transmit, via secondary radio 426, instructions to hotspot client device 302 instructing hotspot client device 302 to begin operating as a hotspot. Controller 400 is configured to execute instructions stored on memory 402, including hotspot program 403, causing primary radio 424 to instruct hotspot client device 302 to begin operating as a hotspot for LAN 308.

After the hotspot client device is instructed to operate as a hotspot (S210), the hotspot client device communicates with the Internet in place of the gateway device (S212). This will be described in greater detail with reference to FIG. 3C.

Figure 3C:
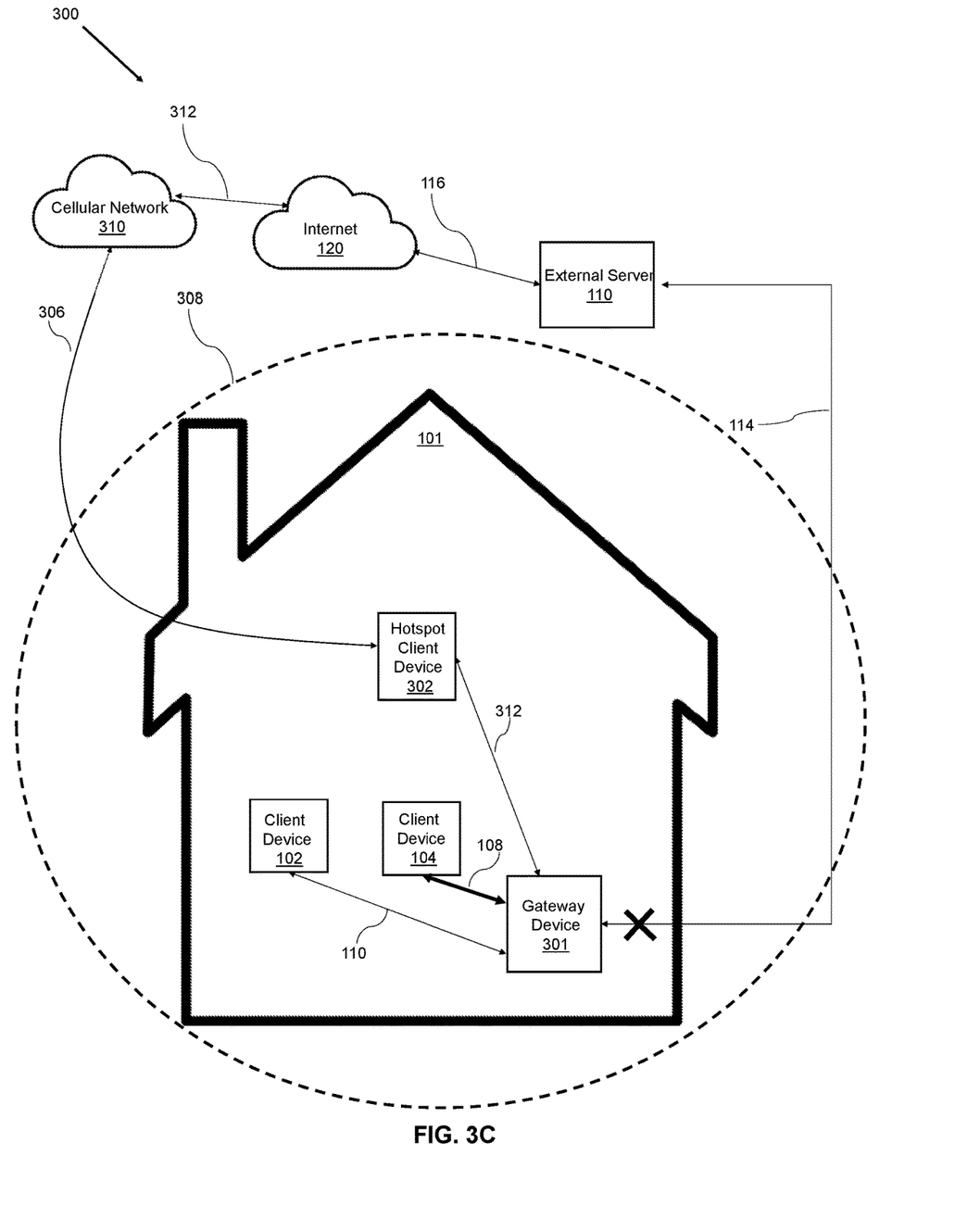
FIG. 3C illustrates a communication system at a time $t_2$ in accordance with aspects of the present disclosure.

FIG. 3C illustrates a communication system 300 at a time $t_2$ in accordance with aspects of the present disclosure.

As shown in FIG. 3C, wireless communication system 114 is crossed out, indicating that gateway device 301 still does not have access to Internet 120 through wireless communication channel 114. Further, wireless communication channel 304 has been replaced with wireless communication channel 312. Wireless communication channel 304 corresponds with primary radio 424 of gateway device 301 during the primary mode of operation thereby communicating with primary radio 404 of hotspot client device 302. On the other hand, wireless communication channel 312 corresponds with gateway device 301 during the hotspot mode of operation, wherein secondary radio 426 of gateway device 301 communicates with secondary radio 405 of hotspot client device 302.

Now consider the situation wherein hotspot client device 302 has received instructions from gateway device 301 instructing hotspot client device 302 to begin operating as a hotspot for LAN 308, i.e., the hotspot mode of operation.

Cellular radio 406 of hotspot client device 302 will communicate with Internet 120 through cellular communication channel 306, cellular network 310, and wireless communication channel 312. Controller 420 is configured to execute instructions stored on memory 422, including hotspot program 423, to cause secondary radio 426 to connect to secondary radio 405 of hotspot client device 302. Hotspot client device 302 allows gateway device 301 access to Internet 120. Client devices 102 and 104 are able to maintain access to Internet 120 by being connected to gateway device 301.

During the hotspot mode of operation, gateway device 301 will transpond communication data client devices 102 and 104 that is directed to Internet 120, not through communication channel 114, but wirelessly through hotspot client device 302—and then further through cellular network 310. Because the communication data being transponded from client devices 102 and 104 are being wirelessly transponded to hotspot client device 302, a dedicated radio should be used. In particular, if primary radio 424 were used, and thus the channels for which primary radio 424 was using to wirelessly communicate with client device 102 and hotspot client device 302, to also transpond the communication data be from client devices 102 and 104, then there is an increased chance for interference and data collision. Therefore, in accordance with aspects of the present disclosure, secondary radio 426 of gateway device 301 and secondary radio 405 of hotspot client device 302 are dedicated radios for transponding data from the other client devices within LAN 308 during the hotspot mode of operation.

Returning to FIG. 2, after the hotspot client device communicates with the Internet in place of the gateway device (S212), it is determined whether the Internet has reconnected (S214). For example, controller 420 is configured to execute instructions stored on memory 422, including hotspot program 423, to cause gateway device 301 to attempt to reconnect to Internet 120 through communication channel 114. Hotspot client device 302 providing internet access to LAN 308 is a temporary solution. As soon as gateway device 301 is able to reconnect to Internet 120, hotspot client device 302 will stop operating as a hotspot and reconnect to primary radio 424 via primary radio 404.

If it is determined that the Internet has not reconnected (N at S214), the hotspot client device continues to communicate with the Internet (Return to S212). For example, if gateway device 301 monitors communication channel 114 and finds that it is still inactive, hotspot client device 302 will continue to act as a hotspot for LAN 308. This process will continue until gateway device 301 is able to connect to Internet 120 via communication channel 114.

If it is determined that the Internet has reconnected (Y at S214), the hotspot client device is instructed to stop operating as a hotspot (S216). For example, presume that while hotspot client device 302 is operating as a hotspot for LAN 308, gateway device 301 determines that communication channel 114 is active again. Controller 420 is configured to execute instructions stored on memory 422, including hotspot program 423, to cause secondary radio 426 to instruct hotspot client device 302 to stop operating as a hotspot for LAN 308.

After the hotspot client device is instructed to stop operating as a hotspot (S216), the gateway device once again checks if the Internet has been disconnected (Return to S208). For example, gateway device 301 will operate normally until there is another disconnection from Internet 120.

Internet disconnections can occur for a multitude of reasons, all of which are inconvenient to users operating network devices. Further, network disconnections can last for an extended period of time. When the users have urgent business to take care of, this can be a serious problem.

In accordance with the present disclosure, a gateway device is used with a hotspot client device. The hotspot client device will connect to the network, and both devices will communicate with a primary radio. If the gateway device is disconnected from the Internet, the gateway device, using a secondary radio, will instruct the secondary radio of the hotspot client device to operate as a hotspot for the Internet. The hotspot client device will operate as a hotspot and connect to the Internet through the use of a third cellular radio. The gateway device will connect to the hotspot device, thereby providing Internet access to all network devices that were previously connected to the gateway device. Once the gateway device is able to reconnect to the Internet, the hotspot client device will be instructed to stop operating as a hotspot.

Thus, the present disclosure as disclosed allows a hotspot client device to temporarily provide Internet access to a gateway device until the gateway device is able to reconnect to the network.

The operations disclosed herein may constitute algorithms that can be affected by software, applications (apps, or mobile apps), or computer programs. The software, applications, computer programs can be stored on a non-transitory computer-readable medium for causing a computer, such as the one or more processors, to execute the operations described herein and shown in the drawing figures.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A gateway device for use with a wide area network (WAN), a wireless WAN, a local area network (LAN) created by the gateway device, a client device and a hotspot client device, the gateway device comprising:
   a memory, the memory storing instructions thereon;
   a primary communication system comprising a first radio and an interface, the primary communication system being configured to enable the gateway device to operate in a primary mode of operation;
   a secondary communication system comprising the first radio, a second radio and the interface, the secondary communication system being configured to enable the gateway device to operate in a hotspot mode of operation, wherein during the primary mode of operation the first radio is active and the second radio is inactive, and wherein during the hotspot mode of operation the first radio is inactive and the second radio is active; and
   a processor configured to execute the instructions to cause the gateway device to:
      instruct the primary communication system of the gateway device to:
         communicate, via the LAN, with the client device so as to transpond a first client device data between the client device and the WAN, wherein the gateway device connects to the WAN via a communication channel; and wirelessly communicate with the hotspot client device so as to transpond a second client device data between the hotspot client device and the WAN;

detect a loss of connection with the WAN via the communication channel;

send an instruction to the hotspot client device to begin operating as a Wi-Fi hotspot for the gateway device; and instruct the secondary communication system of the gateway device to transpond, over a dedicated channel, a third client device data between the client device and the WAN via the Wi-Fi hotspot, wherein the dedicated channel comprises a communication from the second radio of the gateway device to a secondary radio of the hotspot client device, and a communication from the hotspot client device to a cellular network.

2. The gateway device of claim 1, wherein the primary communication system comprises an ethernet communication system.

3. The gateway device of claim 2, wherein the primary communication system additionally comprises a wireless communication system.

4. The gateway device of claim 3, wherein the primary communication system is configured to transpond the first client device data between the client device and the WAN via a data over a cable service interface specification communication channel.

5. The gateway device of claim 3, wherein the primary communication system is configured to transpond the first client device data between the client device and the WAN via a data over a passive optical network communication channel.

6. The gateway device of claim 1, wherein the primary communication system comprises a wireless communication system.

7. The gateway device of claim 1, wherein the processor is further configured to execute the instructions to further cause the gateway device to:

after sending the instructions to the hotspot client device to begin operating as the Wi-Fi hotspot for the gateway device, determine that the gateway device is connected to the WAN via the communication channel; and instruct the hotspot client device to stop operating as the Wi-Fi hotspot for the gateway device.

8. A method of using a gateway device with a wide area network (WAN), wireless WAN, a local area network (LAN) created by the gateway device, a client device and a hotspot client device, the method comprising:

instructing a primary communication system, being configured to enable the gateway device to operate in a primary mode of operation, comprising a first radio and an interface of the gateway device to:

communicate, via the LAN, with the client device so as to transpond a first client device data between the client device and the WAN, wherein the gateway device connects to the WAN via a communication channel; and wireless communicate with the hotspot client device so as to transpond a second client device data between the hotspot client device and the WAN;

detecting a loss of connection with the WAN via the communication channel;

sending an instruction to the hotspot client device to begin operating as a Wi-Fi hotspot for the gateway device; and instructing a secondary communication system comprising the first radio, a second radio and the interface of the gateway device to transpond, over a dedicated channel, a third client device data between the client device and the WAN via the Wi-Fi hotspot, wherein the secondary communication system being configured to enable the gateway device to operate in a hotspot mode of operation, wherein during the primary mode of operation the first radio is active and the second radio is inactive, wherein during the hotspot mode of operation the first radio is inactive and the second radio is active, and wherein the dedicated channel comprises a communication from the second radio of the gateway to a secondary radio of the hotspot client device, and a communication from the hotspot client device to a cellular network.

9. The method of claim 8, wherein the primary communication system comprises an ethernet communication system.

10. The method of claim 9, wherein the instructing the primary communication system additionally comprises a wireless communication system, wherein the wireless communication system transponds a portion of the first client device data and transponds a portion of the second client device data.

11. The method of claim 10, wherein the primary communication system is configured to transpond the first client device data between the client device and the WAN via a data over a cable service interface specification communication channel.

12. The method of claim 10, wherein the primary communication system is configured to transpond the first client device data between the client device and the WAN via a passive optical network communication channel.

13. The method of claim 8, wherein the primary communication system comprises a wireless communication system.

14. The method of claim 8, further comprising:

after sending the instructions to the hotspot client device to begin operating as the Wi-Fi hotspot for the gateway device, determining that the gateway device is connected to the WAN via the communication channel; and instructing the hotspot client device to stop operating as the Wi-Fi hotspot for the gateway device.

15. A non-transitory, computer-readable media of a gateway device having computer-readable instructions stored thereon, the computer-readable instructions being capable of being read by a processor of the gateway device for use with a wide area network (WAN), wireless WAN, a local area network (LAN), a client device and a hotspot client device, the computer-readable instructions, when executed by the processor, cause the gateway device to perform the method comprising:

instructing a primary communication system, being configured to enable the gateway device to operate in a primary mode of operation, comprising a first radio and an interface of the gateway device to:

communicate, via the LAN, with the client device so as to transpond a first client device data between the client device and the WAN, wherein the gateway device connects to the WAN via a communication channel; and wirelessly communicate with the hotspot client device so as to transpond a second client device data between the hotspot client device and the WAN;

detecting a loss of connection with the WAN via the communication channel;

sending an instruction to the hotspot client device to begin operating as a Wi-Fi hotspot for the gateway device; and instructing a secondary communication system comprising the first radio, a second radio and the interface of the gateway device to transpond, over a dedicated channel, a third client device data between the client device and the WAN via the Wi-Fi hotspot, wherein the secondary communication system is configured to enable the gateway device to operate in a hotspot mode of operation, wherein during the primary mode of operation the first radio is active and the second radio is inactive, and wherein during the hotspot mode of operation the first radio is inactive and the second radio is active, and wherein the dedicated channel comprises a communication from the second radio of the gateway to a secondary radio of the hotspot client device, and a communication from the hotspot client device to a cellular network.

16. The non-transitory, computer-readable media of claim 15, wherein the computer-readable instructions wherein the primary communication system comprises an ethernet communication system.

17. The non-transitory, computer-readable media of claim 16, wherein the primary communication system comprises a wireless communication system, wherein the wireless communication system to transponds a portion of the first client device data between the client device and the WAN and transponds a portion of the second client device data between the hotspot client device and the WAN.

18. The non-transitory, computer-readable media of claim 17, wherein the primary communication system is configured to transpond the first client device data between the client device and the WAN via a data over a cable service interface specification communication channel.

19. The non-transitory, computer-readable media of claim 17, wherein the primary communication system is configured to transpond the first client device data between the client device and the WAN via a passive optical network communication channel.

20. The non-transitory, computer-readable media of claim 15, wherein the primary communication system comprises a wireless communication system.

* * * * *